United States Patent
Le Tual et al.

(10) Patent No.: US 9,298,666 B2
(45) Date of Patent: Mar. 29, 2016

(54) DATA SYNCHRONIZATION CIRCUIT

(75) Inventors: Stéphane Le Tual, Saint-Egrève (FR); Pratap Singh, Varanasi (IN)

(73) Assignee: STMicroelectronics SA, Montrouge (FR)

( * ) Notice: Subject to any disclaimer, the term of this patent is extended or adjusted under 35 U.S.C. 154(b) by 668 days.

(21) Appl. No.: 13/300,318

(22) Filed: Nov. 18, 2011

(65) Prior Publication Data

US 2012/0286832 A1 Nov. 15, 2012

(30) Foreign Application Priority Data

May 11, 2011 (FR) ...................................... 11 54070

(51) Int. Cl.
*H04L 7/00* (2006.01)
*G06F 13/42* (2006.01)

(52) U.S. Cl.
CPC .................................. *G06F 13/423* (2013.01)

(58) Field of Classification Search
CPC ....... H04L 7/0008; H04L 7/02; H04L 7/0337; H04L 7/0334; H04L 7/033; H04L 7/027
USPC ......... 375/354–355, 359; 710/69; 340/870.21
See application file for complete search history.

(56) References Cited

U.S. PATENT DOCUMENTS

| 6,078,546 | A  | * | 6/2000 | Lee | ........................... 365/233.11 |
| 6,603,706 | B1 | * | 8/2003 | Nystuen et al. | ............. 365/233.1 |
| 6,867,759 | B1 | * | 3/2005 | Baek et al. | ....................... 345/99 |
| 7,336,253 | B2 | * | 2/2008 | Kim | ................................ 345/98 |

FOREIGN PATENT DOCUMENTS

EP 0276641 10/1987
WO WO2006/006893 1/2006

OTHER PUBLICATIONS

République Française Institut National De La Propriété Industrielle, Rapport De Recherche Préliminaire (Preliminary Search Report); issued in French Patent Application No. 1154070 on Nov. 11, 2011 (7 pages).

* cited by examiner

*Primary Examiner* — Dac Ha
*Assistant Examiner* — Janice Tieu
(74) *Attorney, Agent, or Firm* — Slater & Matsil, L.L.P.

(57) ABSTRACT

The invention concerns a circuit comprising: a first circuit block (302) adapted to receive a first clock signal (CLK1) and to provide a first output data signal at a time determined by said first clock signal; a second circuit block (304) adapted to receive a second clock signal (CLK2) and to provide a second output data signal at a time determined by said second clock signal; a clock bus (314) coupled to corresponding outputs of said first and second circuit blocks for receiving a third clock signal (BCLK) based on said first and second clock signals; and a synchronization unit (312) coupled to said clock bus and adapted to sample said first and second output data signals based on said third clock signal.

35 Claims, 5 Drawing Sheets

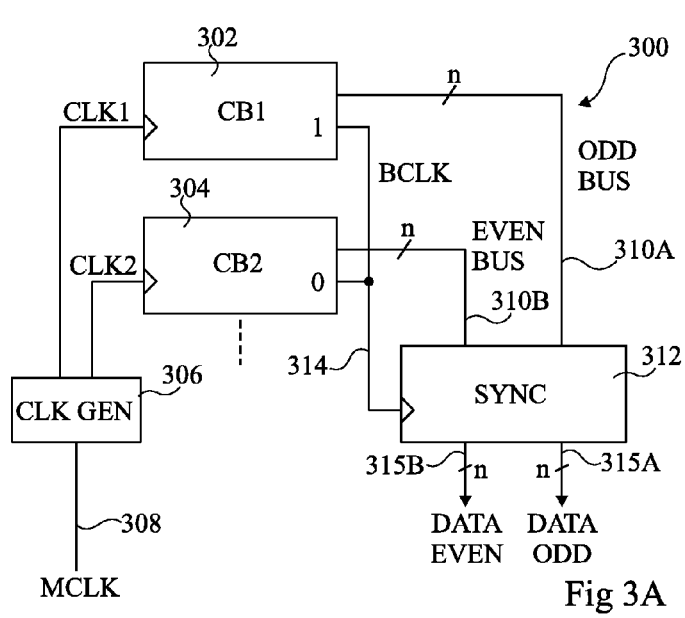
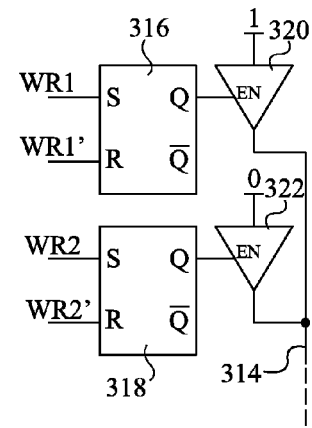
Fig 3A
Fig 3B
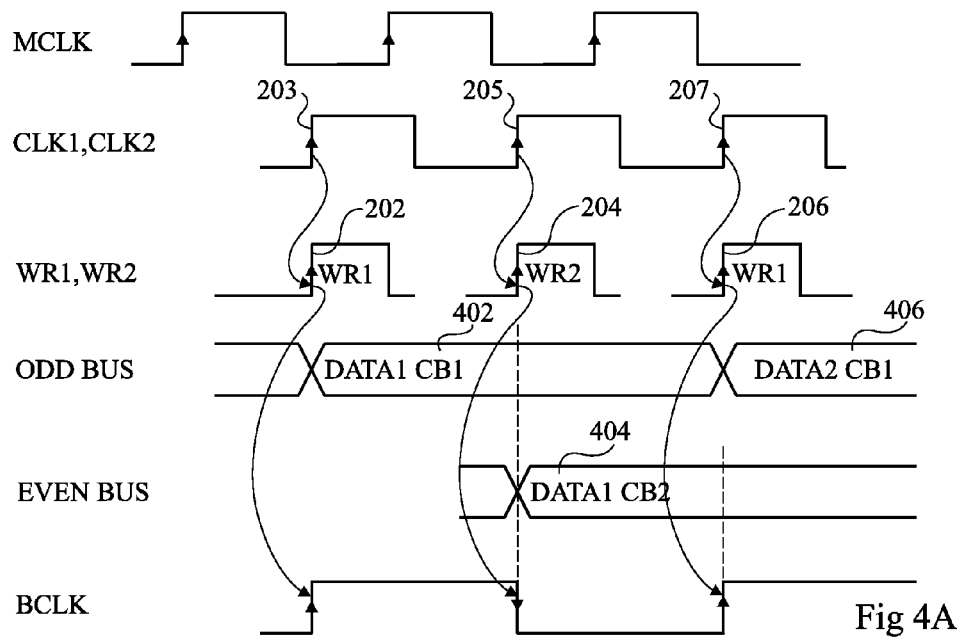
Fig 4A
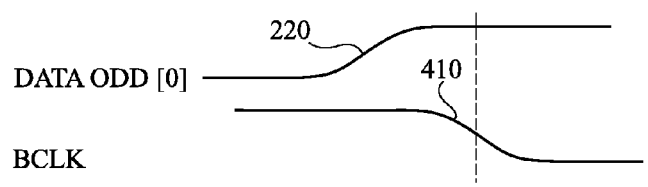
Fig 4B

DATA SYNCHRONIZATION CIRCUIT

This application claims the benefit of French National Patent Application No. 11/54070, filed on May 11, 2011, entitled "Data synchronization circuit," which application is hereby incorporated herein by reference.

TECHNICAL FIELD

The present invention relates to a circuit and method for data synchronization, and in particular to a method and circuit for synchronizing data provided by a plurality of circuits.

BACKGROUND

In various applications, the output data from a number of circuit blocks are interleaved to provide an output data sequence. For example, multiple analog-to-digital converters (ADCs) or other types of processing units may operate in parallel, thereby increasing the data processing capacity of the system and the data rate of the output data.

Each of the parallel circuit blocks is for example controlled based on a master clock signal, and the outputs of the circuit blocks can be interleaved by assigning one clock cycle of the master clock signal to each of the circuit blocks in turn for outputting data. With an objective of further increasing the throughput of such systems, there is a trend for using increasingly higher master clock frequencies, for example over 1 GHz, and as high as 10 GHz or more.

There is a problem in synchronizing the output data from each of the circuit blocks by a synchronization block. Indeed, due to a difference in the time delay between the master clock and the clock signal present at each of the circuit blocks and the clock signal present at the synchronization block, it is generally not adequate to use the master clock signal to directly clock the synchronization block. Furthermore, at relatively high frequencies of the master clock signal, there is a problem in determining the correct delay to be applied to the master clock that is suitable for synchronizing the data.

SUMMARY OF THE INVENTION

In one aspect, embodiments of the present invention provide for a circuit. The circuit includes a first circuit block, a second circuit block, a clock bus, and a synchronization unit. The first circuit block is adapted to receive a first clock signal and to provide a first output data signal at a time determined by the first clock signal. The second circuit block is adapted to receive a second clock signal and to provide a second output data signal at a time determined by the second clock signal. The clock bus is coupled to corresponding outputs of the first and second circuit blocks for receiving a third clock signal based on said first and second clock signals, and the synchronization unit is coupled to the clock bus and adapted to sample the first and second output data signals based on the third clock signal.

In another aspect, embodiments of the present invention provide for a method of synchronization that includes receiving, by a first circuit block, a first clock signal, and providing, by the first circuit block, a first output data signal at a time determined by said first clock signal. The method further includes receiving, by a second circuit block, a second clock signal, and providing, by the second circuit block, a second output data signal at a time determined by said second clock signal. The method also includes generating, by said first and second circuit blocks on a clock bus, a third clock signal based on said first and second clock signals, and sampling said first and second output data signals based on said third clock signal.

In yet another aspect, embodiments of the present invention provide for a circuit having a master clock generator, and a first logic block having a clock input coupled to the master clock generator. The first logic block also has a data output coupled to a first data bus, and a clock output coupled to a clock bus. The first logic block is configured to generate a rising edge of a clock signal on the clock bus. The circuit also includes a second logic block having a clock input coupled to the master clock generator, a data output coupled to a second data bus, and a clock output coupled to the clock bus. The second logic block is configured to generate a falling edge of a clock signal on the clock bus. The circuit further includes a synchronization block having a first data input coupled to the first data bus, a second data input coupled to the second data bus, and a clock input coupled to the clock bus.

BRIEF DESCRIPTION OF THE DRAWINGS

The foregoing and other purposes, features, aspects and advantages will become apparent from the following detailed description of embodiments, given by way of illustration and not limitation with reference to the accompanying drawings, in which:

FIG. 3A illustrates a circuit according to an embodiment;
FIG. 3B illustrates circuitry for generating timing signals in the circuit of FIG. 3A according to an embodiment;
FIGS. 4A and 4B show timing diagrams corresponding to the circuit of FIG. 3A according to an embodiment.

DETAILED DESCRIPTION OF ILLUSTRATIVE EMBODIMENTS

Figure 1:
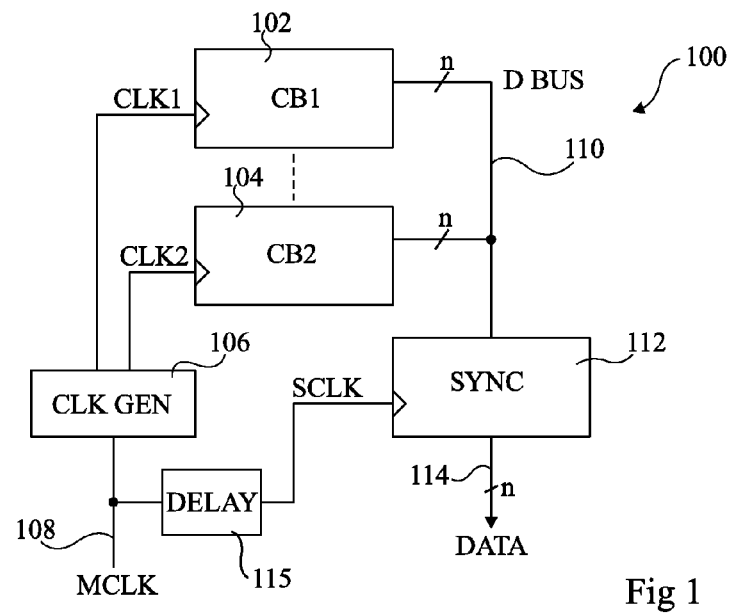
FIG. 1 illustrates a circuit according to one embodiment.

Before addressing the illustrated embodiments in detail, various embodiments and advantageous features thereof will be addressed generally in the following paragraphs. In general many of the described embodiments aim at at least partially addressing one or more problems in the prior art.

According to one embodiment, there is provided a circuit comprising a first circuit block adapted to receive a first clock signal and to provide a first output data signal at a time determined by said first clock signal; a second circuit block adapted to receive a second clock signal and to provide a second output data signal at a time determined by said second clock signal; a clock bus coupled to corresponding outputs of said first and second circuit blocks for receiving a third clock signal based on said first and second clock signals; and a synchronization unit coupled to said clock bus and adapted to sample said first and second output data signals based on said third clock signal.

According to one embodiment, the first and second clock signals are generated based on a master clock signal.

According to another embodiment, each of said first and second circuit blocks comprises an SR flip-flop adapted to activate a corresponding buffer to generate said third clock signal on said clock bus.

According to another embodiment, the circuit further comprises a third circuit block adapted to receive a third clock signal and to provide a third output data signal at a time determined by said third clock signal, wherein said clock bus is further coupled to an output of said third circuit block, said third clock signal being further based on said third clock signal, and wherein said synchronization unit is adapted to said first, second and third output data signals based on said third clock signal.

According to another embodiment, said first circuit block is adapted to provide said first output data signal on a first data bus at a time determined by a first timing edge of said first clock signal and wherein said second circuit block is adapted to provide said second output data signal on a second data bus at a time determined by a first timing edge of second clock signal, said first and second data buses being coupled to said synchronization unit.

According to another embodiment, said second circuit block is adapted to apply, based on said first timing edge of said second clock signal, a first timing edge of said third clock signal on said clock bus and wherein said synchronization unit is adapted to sample said first output data signal based on said first timing edge of said third clock signal.

According to another embodiment, the circuit further comprises a third circuit block adapted to provide a third output data signal on said first data bus and a fourth circuit block adapted to provide a fourth output data signal on said second data bus.

According to another embodiment, the circuit further comprises a third circuit block adapted to provide a third output data signal on a third data bus and a fourth circuit block adapted to provide a fourth output data signal on a fourth data bus.

According to another embodiment, said first and second circuit blocks are adapted to provide said first and second output data signals on a common data bus.

According to another embodiment, said first circuit block is adapted to output said first output data signal at a time determined by a first timing edge of said first clock signal, and to assert a rising and a falling timing edge on said clock bus based on said first timing edge or on a further timing edge following said first timing edge, and said synchronization unit is adapted to sample said first output data signal based on said rising or falling timing edge.

According to another embodiment, said first and second circuit blocks are analog to digital converters adapted to operate in an interleaved fashion.

According to another embodiment, said first and second circuit blocks are processing units adapted to operate in parallel.

A further embodiment provides an electronic device comprising the above circuit, at least one data input coupled to said first and second circuit blocks, and at least one data output coupled to an output of said synchronization unit.

A further embodiment provides a method of synchronization comprising: receiving, by a first circuit block, a first clock signal; providing, by the first circuit block, a first output data signal at a time determined by said first clock signal; receiving, by a second circuit block, a second clock signal; providing, by the second circuit block, a second output data signal at a time determined by said second clock signal; generating, by said first and second circuit blocks on a clock bus, a third clock signal based on said first and second clock signals; and sampling said first and second output data signals based on said third clock signal.

According to one embodiment, generating said third clock signal comprises asserting by said first circuit block a first timing edge on said clock bus and asserting by said second circuit block a second timing edge on said clock bus.

In the following description, only those features useful for an understanding of the present disclosure will be discussed in detail. Other features, such as the particular applications of the circuits described herein, will not be described in detail, it being within the capabilities of the skilled person to apply the teachings of the present disclosure to any suitable application.

FIG. 1 illustrates a circuit 100 comprising a circuit block CB1 102 and a circuit block CB2 104. Additional circuit blocks may be provided in parallel with the blocks 102, 104. The circuit blocks 102, 104 are adapted to operate in an interleaved fashion. In particular, blocks 102, 104 receive corresponding clock signals CLK1 and CLK2 from a clock generation block (CLK GEN) 106, which generates the timing signals based on a master clock signal MCLK, received on an input line 108. For example, block 106 comprises a clock tree for distributing the master clock MCLK and generating the clock signals CLK1, CLK2, and may optionally adapt the clock signals CLK1, CLK2 for each of the circuit blocks.

The circuit blocks 102, 104 each provide output data on a common data bus (D BUS) 110, and the clock signals CLK1 and CLK2 comprise corresponding timing edges for timing the output of the data on these buses, such that the output data is interleaved.

The data on the data bus 110 is synchronized by a further clock signal SCLK by a synchronization block (SYNC) 112, to provide synchronized output data at an output 114.

The clock signal SCLK is generated based on the master clock MCLK. However, given that the transmission paths between the master clock and the clock signals CLK1, CLK2 and SCLK are different, each clock signal will be subjected to a different time delay with respect to the master clock. Therefore, a delay block (DELAY) 115 is for example provided between the master clock MCLK and the synchronization clock SCLK for introducing a delay. However, at relatively high frequencies of the master clock MCLK, for example greater than 1 GHz, such a solution is not adequate, as will now be described with reference to the timing diagrams of FIGS. 2A and 2B.

Figure 2A:
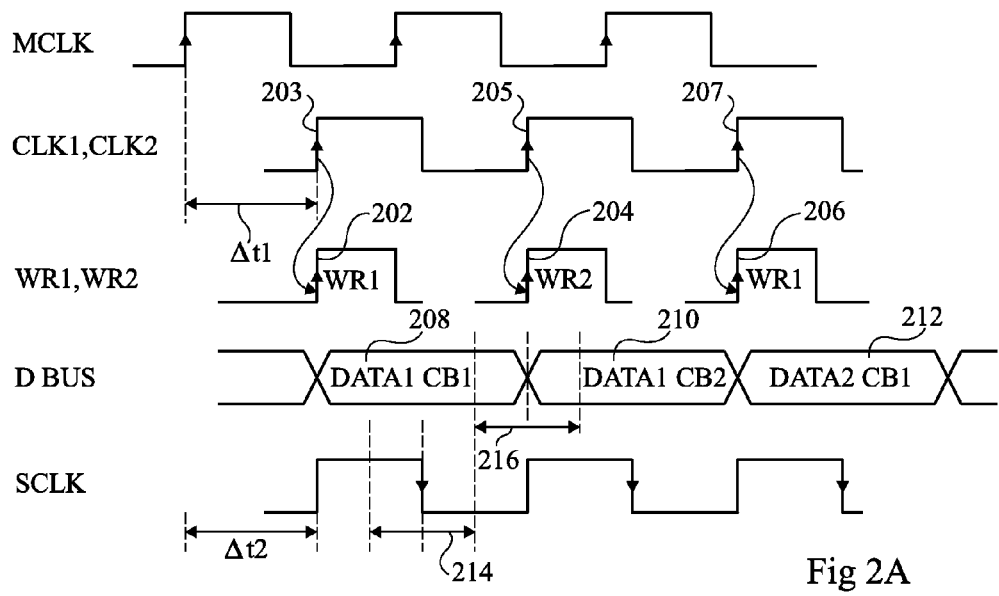
FIGS. 2A and 2B show timing diagrams relating to the circuit of FIG. 1.

FIG. 2A illustrates examples of timing signals of the master clock MCLK, the clock signals CLK1, CLK2, write signals WR1, WR2, data signals D BUS on the data bus 110, and the clock signal SCLK.

The master clock MCLK is a square wave. In the example of FIG. 2A, the clock signals CLK1, CLK2 are each identical, and correspond to a version of the master clock signal MCLK delayed by a time delay $\Delta t1$. Alternatively, in some cases there may be some delay between the clock signals CLK1 and CLK2, in which case each would have a different delay with respect to the master clock MCLK.

The write signals WR1 and WR2 correspond to signals generated within the circuit blocks 102, 104 respectively, and are used to time the writing by each block onto the data bus 110. In the example of FIG. 2A, a rising edge 202 of the write signal WR1 is generated based on a rising edge 203 of the clock signal CLK1, a rising edge 204 of the write signal WR2 is generated based on a rising edge 205 of the clock signal CLK2, and a rising edge 206 of the write signal WR1 is generated based on a rising edge 207 of the clock signal CLK1. Thus, the data bus 110 comprises a write period 208 of data "DATA1 CB1" of the circuit block 102 between edges 202 and 204, a subsequent write period 210 of data "DATA1 CB2" from the circuit block 104 between edges 204 and 206, and a subsequent write period 212 of data "DATA2 CB1" from the circuit block 102 between edge 206 and a subsequent edge of write signal WR2 not shown in FIG. 2A.

The timing of the signal SCLK is illustrated based on an ideal position of its timing edges with respect to the data signals on the data bus. In particular, this signal is shown aligned with the clock signals CLK1, CLK2, in other words having a delay $\Delta t2$ with respect to the master clock signal MCLK equal to the delay $\Delta t1$. Thus the falling edges of the clock signal SCLK are well positioned for sampling the data signals on the data bus 110.

However, the delays $\Delta t1$ and $\Delta t2$, which for example result from gate delays, may vary due to process, voltage and temperature (PVT) variations, causing the relative positioning of the falling edges of the clock signals SCLK and the data signals on data bus 110 to change. As represented by arrows 214 and 216 in FIG. 2A, if the positioning of these edges varies by more than one quarter of a clock period, there is a risk of incurring data errors. For relatively high frequencies of the master clock signal MCLK, such a variation of over a quarter period is possible. For example, assuming that the master clock signal MCLK has a frequency of 5 GHz, a quarter clock cycle is equal to 50 ps. Then, assuming there are 15 gates between the master clock and each of the clock signals CLK1, CLK2, and that each gate introduces a delay of 25 ps, with a 20% variation due to PVT variations, the total delay $\Delta t1$ of the clock signals CLK1, CLK2 with respect to the master clock signal is in that example 375 picoseconds ±75 ps. A delay variation of ±75 ps exceeds the limit of a quarter clock period.

Figure 2B:
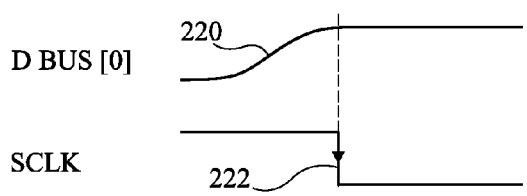

FIG. 2B illustrates timing diagrams showing an example of the data on one of the lines [0] of the data bus 110, and the corresponding timing edges of the clock signal SCLK. As illustrated, the data line [0] comprises a rising edge 220. Due at least in part to capacitive effects of the relatively long data bus 110, the rise time of this edge is relatively long. The falling edge 222 of the signal SCLK has a relatively short fall time, for example due to the proximity between the master clock MCLK and the synchronization block 112. Such a mismatch between the forms of the edges of the data signal and the clock signal SCLK can cause further synchronization difficulties, for example if the edge 222 falls at time when the data signal has not yet reached a high or low state.

FIG. 3A illustrates a circuit 300 comprising circuit blocks 302 and 304 adapted to operate in an interleaved fashion in a similar manner to the circuit of FIG. 1. For the sake of clarity, the various input data signals that may be received by each of the circuit blocks CB1, CB2 have not been illustrated in FIG. 3A. The circuit blocks 302, 304 respectively receive clock signals CLK1 and CLK2 from a clock generation block 306. The clock generation block 306 receives a master clock MCLK on input line 308, and as with block 106 of FIG. 1, it for example comprises a clock tree for generating the clock signals CLK1, CLK2, and optionally adapts the clock signals CLK1, CLK2 for each of the circuit blocks 302, 304.

The circuit 300 comprises an odd data bus (ODD BUS) 310A and an even data bus (EVEN BUS) 310B. The data output of circuit block 302 is coupled to the odd bus 310A, while the data output of the circuit block 304 is coupled to the even bus 310B. Furthermore, as represented by dashes, additional circuit blocks may be provided, receiving corresponding clock signals, and having outputs coupled to the odd or even bus 310A, 310B, depending on the order that the output of each circuit is provided, as will become clear from the description below.

Each of the data buses 310A, 310B is coupled to a synchronization block 312, which also receives a clock signal BCLK on a clock bus 314. Block 312 for example comprises separate output lines (DATA ODD) 315A and (DATA EVEN) 315B, each n bits wide, for the data from the odd and even buses 310A, 310B respectively. Alternatively, the data from the odd and even buses 310A, 310B could be combined on a single set of n output lines. The data buses 310A, 310B, and the outputs 315A, 315B each have a width of n bits, where n is an integer greater than 1, for example equal to between 2 and 128, depending on the particular application. The timing signal BCLK is generated based on the write signals used to write data to the data buses, as will now be described in more detail with reference to FIG. 3B.

FIG. 3B illustrates circuitry present in the circuit blocks 302, 304 for generating the clock signal BCLK on clock bus 314. In particular, circuit block 302 comprises an SR flip-flop 316, that receives at its "set" input a write signal WR1, and at its "reset" input, a signal WR1' having a significant edge occurring a short time delay after the significant edge of write signal WR1. For example, the signal WR1' could be the inverse of the signal WR1, or a signal having a pulse occurring directly after the write pulse of signal WR1. The circuit block 304 comprises an SR flip-flop 318, that receives at its "set" input the write signal WR2, and at its "reset" input, a signal WR2' having a significant edge occurring a short time delay after the significant edge of write signal WR2. For example, the signal WR2' could be the inverse of the signal WR2, or a signal having a pulse occurring directly after the write pulse of signal WR2.

The flip-flops 316, 318 have their Q outputs coupled to an enable input of respective buffers 320 and 322. Buffer 320 applies a logic "1" to the clock bus 314 when activated, while the buffer 322 applies a logic "0" to the clock bus 314 when activated. The buffers 320, 322 are for example the same as the buffers (not illustrated) of the circuit blocks 302 and 304 used to write data to the odd and even buses 310A, 310B respectively, such that the time delays under various PVT conditions will be well matched.

The write signals WR1 and WR2 control the timing of the write operations of circuit blocks 302, 304 to the respective buses 310A, 310B. Thus, when the write signal WR1 is asserted to write the data of circuit 302 on the odd bus 310A, a rising edge is also asserted on the clock bus 314, and when the write signal WR2 is asserted to write the data on the even bus 310B, a falling edge is asserted on the clock bus 314.

FIG. 4A illustrates examples of timing diagrams of the master clock signal MCLK, the clock signals CLK1, CLK2, the write signals WR1, WR2, the data signals on the odd and even buses 310A, 310B and the clock signal BCLK, of the circuit of FIG. 3A.

The signals MCLK, CLK1, CLK2 and WR1, WR2 are the same as those of FIG. 2A and will not be described again in detail. It should be noted that in some cases, the clock signals CLK1 and CLK2 could be different from the master clock, for example comprising only some of the pulses of the master clock signal MCLK, such as alternate pulses.

The data signals provided on the data buses 310A, 310B are the same as those of FIG. 2A, but are provided alternately on the odd and even buses, and thus remain on each bus for twice as long. Thus, the data signal "DATA1 CB1" from the circuit block 302 is provided on the odd bus 310A for a period 402 between the rising edges 202 and 206 of the write signal WR1. Similarly, the data signal "DATA1 CB2" is provided on the even bus 310B for a period 404 between the rising edge 204 and a subsequent rising edge (not shown in FIG. 4A) of the write signal WR2. The data signal "DATA2 CB1" is provided on the odd bus 310A for a period 406 from rising edge 206 to a following rising edge (not shown in FIG. 4A) of the write signal WR1.

The clock signal BCLK comprises rising edges aligned with the rising edges 202, 206 etc. of the write signal WR1, and falling edges aligned with the rising edges 204 etc. of the write signal WR2. The falling edges of the clock signal BCLK are thus appropriately positioned for sampling the data on the odd bus 310A, while the rising edges of the clock signal BCLK are appropriately positioned for sampling the data on the even bus 310B. Furthermore, any variations in the timing of the write signals will also be reflected in the timing of the clock signal BCLK.

FIG. 4B illustrates a further benefit of the embodiment of FIG. 3A, which is that the data signals on the buses 310A and 310B have a transmission path of similar length to the signal on the clock bus 314. An example of the signal on a data line [0] of the odd bus 310A is illustrated, having a rising edge 220 with relatively long rise time. However, the edge 410 of the corresponding signal BCLK at the level of the synchronization block 312 has a fall time comparable to the rise time of edge 220, thereby aiding a precise edge positioning.

Figure 5:
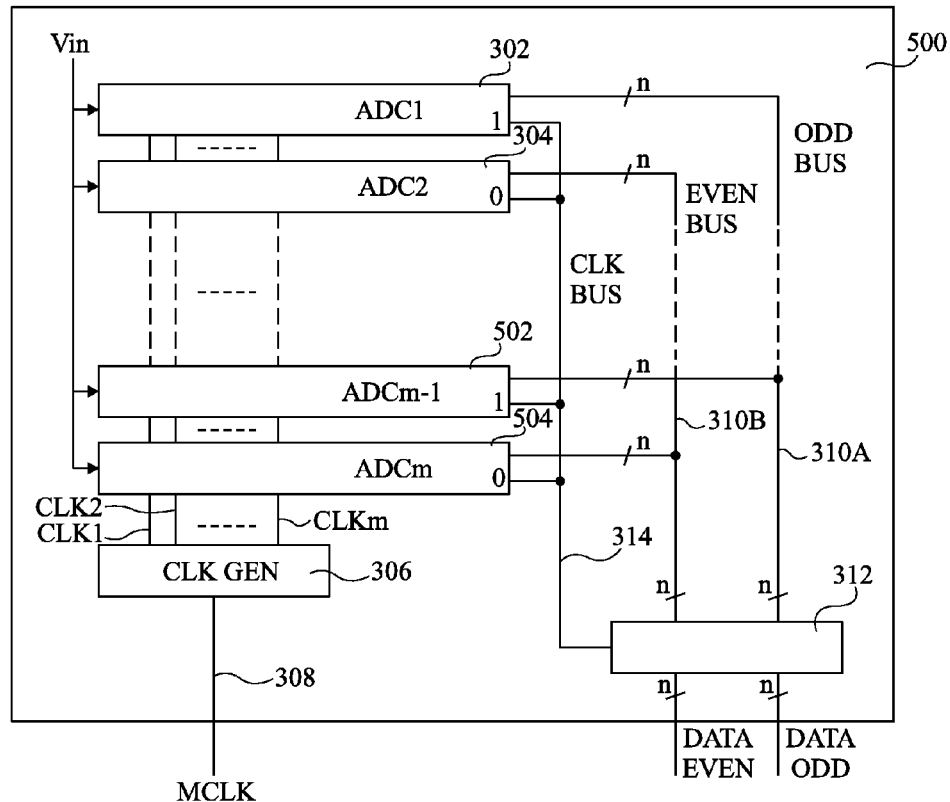
FIG. 5 illustrates a circuit according to a further embodiment.

FIG. 5 illustrates a circuit 500, similar to the embodiment of the FIG. 3A, and the like features have been labeled with like references. In the embodiment of FIG. 5, there are a total of m circuit blocks, each of which is, in this example, an analog to digital converter (ADC) receiving an input voltage Vin and providing output data in the form of an n-bit value representing the level of the input voltage. A first two of the circuit blocks ADC1 and ADC2 for example correspond to the circuit blocks 302, 304 of FIG. 3A, and the last two ADCm-1 and ADCm are labeled 502, 504. The value m could be anything from four to several hundred.

In the example of FIG. 5, the clock generation block 306 provides a series of clock signals CLK1 to CLKm, each of these timing signals being provided to each of the circuit blocks.

The circuit blocks ADC1 to ADCm provide output data in turn on the output buses, and the odd circuits ADC1, ADC3 . . . etc. to ADCm-1 are coupled to the odd data bus 310A, while the even circuits ADC2, ADC4 . . . etc. to ADCm are coupled to the even data bus 310B. In the example of FIG. 5, the odd circuit blocks apply a rising edge to the clock bus 314 when their corresponding write signal is asserted, while the even circuits apply a falling edge to the clock bus 314 when their corresponding write signal is asserted. Obviously, in alternative embodiments, the odd circuit blocks could apply a falling edge to the clock bus 314, and the even circuit blocks could apply a rising edge to the clock bus 314.

Operation of the circuit of FIG. 5 will now be described in more detail with reference to the timing diagrams of FIG. 6.

Figure 6:
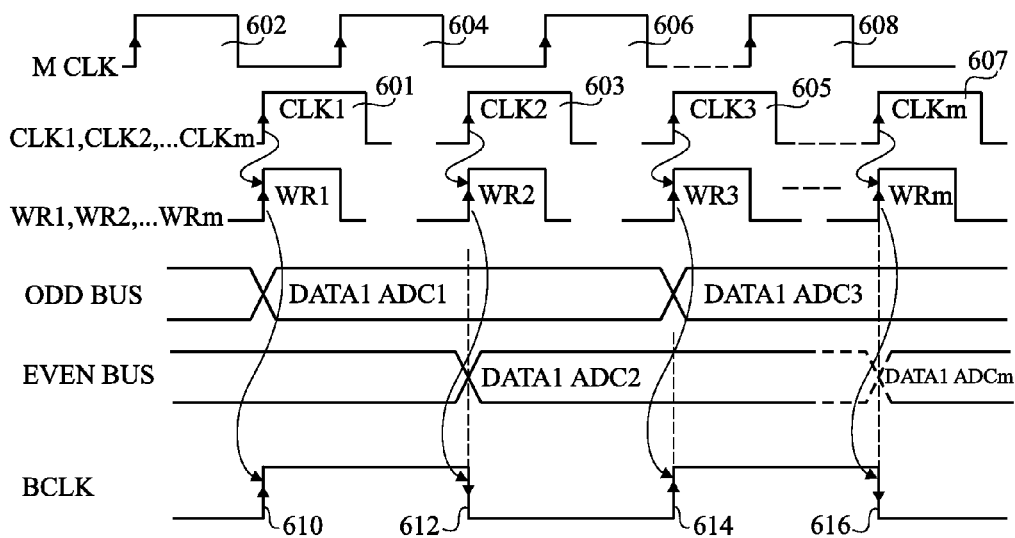
FIG. 6 shows a timing diagrams corresponding to the circuit of FIG. 5 according to an embodiment.

FIG. 6 illustrates examples of timing diagrams for the master clock signal MCLK, the clock signals CLK1 to CLKm, the write signals WR1 to WRm, data signals on the odd and even buses, and the signal BCLK on the clock bus 314, in the circuit of FIG. 5.

In the example of FIG. 6, each of the clock signals CLK1 to CLKm comprises only one pulse of every m pulses of the master clock MCLK. An example of the timing of a first pulse for each of the clock signals CLK1, CLK2, CLK3 and CLKm is shown in FIG. 6, wherein a first pulse 601 of the signal CLK1 is based on a first pulse 602 of the signal MCLK, a first pulse 603 of the signal CLK2 is based on a second pulse 604 of the signal MCLK, a first pulse 605 of the signal CLK3 is based on a third pulse 606 of the signal MCLK, and a first pulse 607 of the signal CLKm is based on an m-th pulse 608 of the signal MCLK.

The rising edge of each of the pulses 601, 603, 605 and 607 is used within the corresponding circuit blocks 302, 304, 502, 504 to generate a corresponding write signal WR1, WR2, WR3 and WRm respectively. Thus, the odd bus 310A comprises, from the rising edge of pulse WR1, a first data signal "DATA1 ADC1" from circuit block ADC1, this data changing at the rising edge of pulse WR3 to a first data signal "DATA1 ADC3" of the circuit block ADC3. Similarly, the even bus 310B comprises, from the rising edge of pulse WR2, a first data signal "DATA1 ADC2" from circuit block ADC2, this data changing at the rising edge of a write pulse WR4 (not shown in FIG. 6) of the fourth circuit block ADC4 to a first data signal "DATA1 ADC4" of this circuit block.

The clock signal BCLK thus comprises a rising edge 610 applied by ADC1 based on the rising edge of the write pulse of signal WR1, a falling edge 612 based on the rising edge of the write pulse of signal WR2, a rising edge 614 based on the rising edge of the write pulse of signal WR3, and a falling edge 616 based on the rising edge of the write pulse of signal WRm. The falling edges of the clock signal BCLK are used to clock the data on the odd bus 310A, while the rising edges of the clock signal BCLK are used to clock the data on the even bus 310B.

Figure 7A:
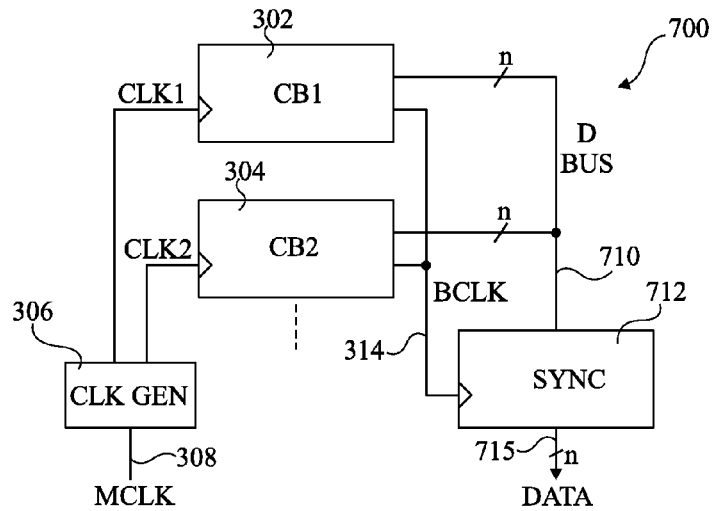
FIG. 7A illustrates a circuit according to yet another embodiment.

FIG. 7A illustrates a circuit 700 according to an alternative embodiment to that of FIG. 3A. Features in common with the embodiment of FIG. 3A have been labeled with like references, and will not be described again in detail.

In circuit 700, there is a single data bus (D BUS) 710, for example n bits wide. The outputs of both the circuit blocks 302 and 304 are coupled to bus 710. The bus 710 is in turn coupled to a synchronization block 712, which samples the data on bus 710 based on the clock signal BCLK on the clock bus 314, to provide output data on n output lines 715. In the embodiment of FIG. 7A, each of the circuit blocks 302, 304 applies both a rising and falling edge to the clock bus 314 when the corresponding write pulse is asserted, as will now be described with reference to the circuit of FIG. 7B.

Figure 7B:
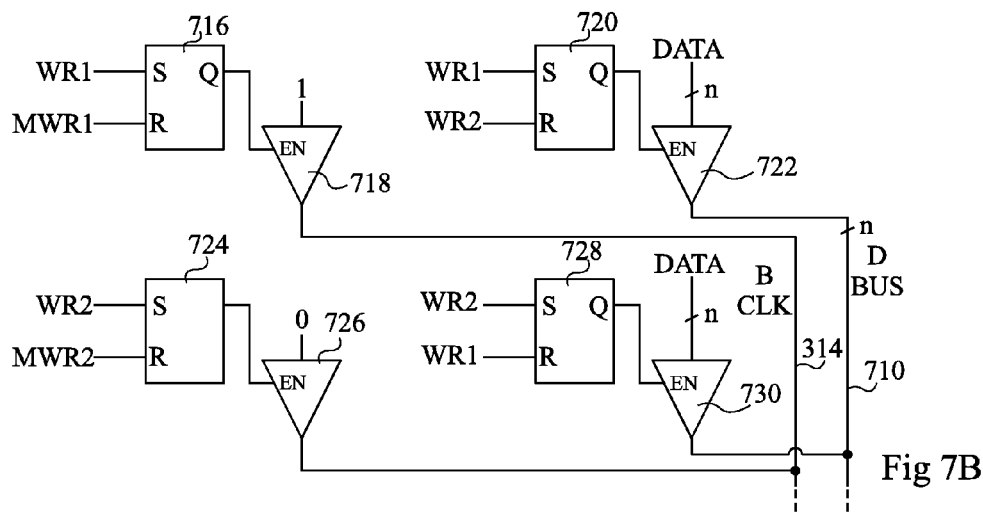
FIG. 7B illustrates circuitry for generating timing signals in the circuit of FIG. 7A according to an embodiment.

FIG. 7B illustrates circuitry of the circuit blocks 302, 304 arranged to generate the clock signal BCLK on the clock bus 314 and the data signal on the data bus 710. In particular, circuit block 302 comprises an SR flip-flop 716 receiving at its "set" input the write signal WR1, and at its "reset" input a mid-write signal MWR1. The mid-write signal indicates a mid-point of the write period of the data, as will be explained in more detail below. The Q output of flip-flop 716 is coupled to an enable input of a buffer 718, which applies a logic "1" level to the clock bus 314 when enabled. The circuit block 302 also comprises an SR flip-flop 720 also receiving at its "set" input the write signal WR1, and for example at its "reset" input the write signal WR2. The Q output of flip-flop 720 is coupled to an enable input of a buffer 722, which applies the data signal to the n-bit data bus 710 when enabled.

The circuit block 304 comprises an SR flip-flop 724 having its "set" input coupled to receive the write signal WR2, and its "reset" input coupled to a mid-write signal MWR2. The Q output of flip-flop 724 is coupled to an enable input of a buffer 726, which applies a logic "0" level to the clock bus 314 when enabled. The circuit block 304 also comprises an SR flip-flop 728 also receiving at its "set" input the write signal WR2, and for example at its "reset" input the write signal WR1, in the case that there are just two circuit blocks 302, 304. Alternatively, if there are more than two circuit blocks, the "reset"

input for example receives the write signal of the next circuit block. The Q output of flip-flop 728 is coupled to an enable input of a buffer 730, which applies the data signal to the n-bit data bus 710 when enabled.

The clock bus buffers 718, 726 and the data buffers 722, 730 for example have the same dimensions, such that the time delays that they introduce are well matched.

The mid-write signals MWR1 and MWR2 are asserted shortly after the corresponding write signal, and are for example generated based on the subsequent falling edge of the corresponding clock signal CLK1, CLK2, as will now be described with reference to the timing diagrams of FIG. 8.

Figure 8:
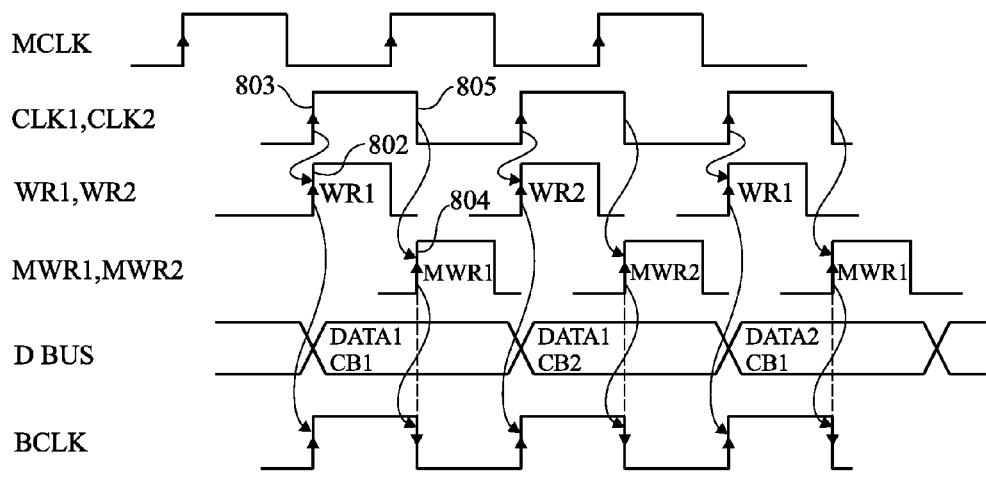
FIG. 8 shows timing diagrams corresponding to the circuit of FIG. 7A according to an embodiment.

FIG. 8 illustrates example timing diagrams of the master clock signal MCLK, the clock signals CLK1, CLK2, the write signals WR1, WR2, the corresponding mid-write time signals MWR1, MWR2, the data signals on the data bus 710, and the clock signal BCLK on clock bus 314.

The timing of the master clock MCLK, the clock signals CLK1, CLK2, write signals WR1, WR2 and the data signal D BUS on the data bus 314 are the same as the example of FIG. 2A, and will not be described again in detail.

The mid-write signals MWR1, MWR2 comprise a rising edge occurring in this example half a clock period of the corresponding clock signals CLK1, CLK2 after each rising edge of the write signals WR1, WR2. Thus, for example, a rising edge 802 of the write signal WR1 is generated based on a rising edge 803 of the clock signal CLK1, and then a rising edge 804 of the signal MWR1 is generated based on the subsequent falling edge 805 of the clock signal CLK1. Thus the clock signal BCLK comprises falling edges timed based on the rising edges of the signals MWR1 and MWR2, these falling edges being at the appropriate time for sampling the corresponding data signals on bus 710.

In alternative embodiments, the mid-write signals MWR1, MWR2 could be generated in a different manner, for example to have rising edges a fixed delay after the corresponding rising edges of the write signals WR1, WR2. Furthermore, in alternative embodiments, the positions of the rising edges of the mid-write signals MWR1, MWR2 could be different from the mid point of the corresponding data signal.

Figure 9:
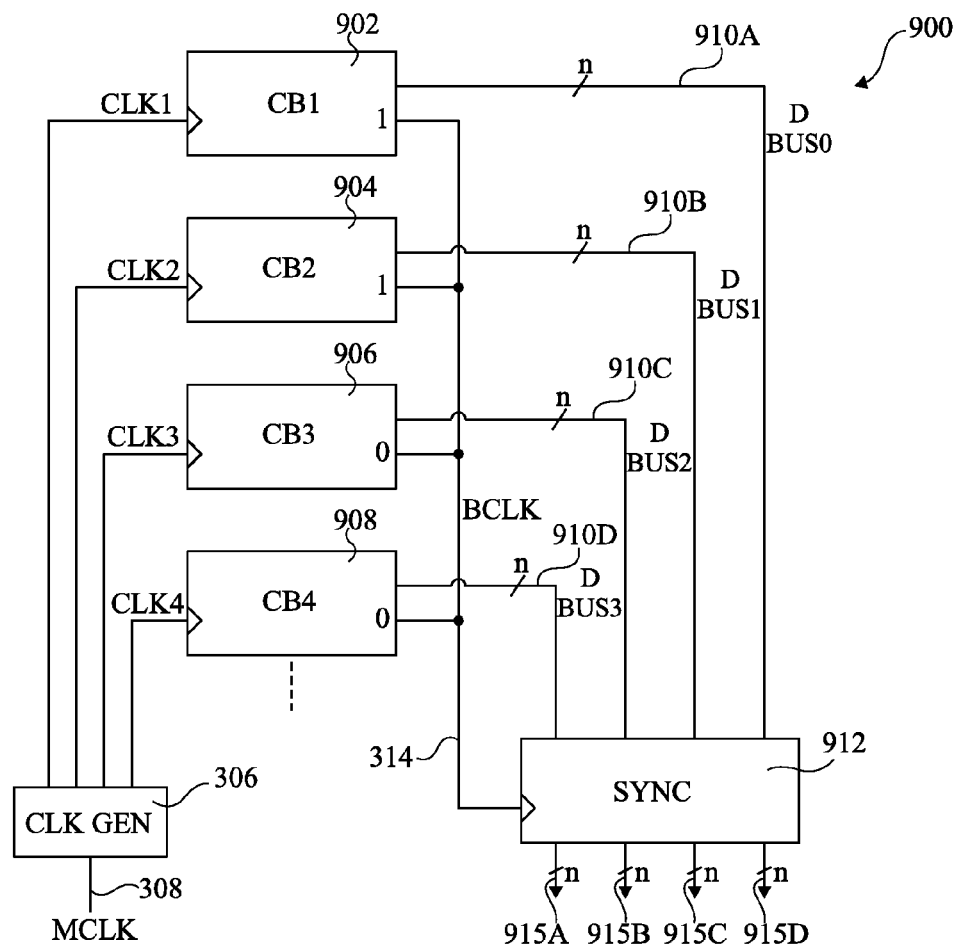
FIG. 9 illustrates a circuit according to yet another embodiment.

FIG. 9 illustrates a circuit 900 according to an alternative embodiment to that of FIGS. 3A and 7A. Features in common with the embodiment of FIG. 3A have been labeled with like references, and will not be described again in detail.

In circuit 900, there are four circuit blocks 902, 904, 906 and 908, receiving respective clock signals CLK1 to CLK4 from the clock generation block 306. The circuit blocks 902 to 908 have outputs coupled to data buses 910A, 910B, 910C and 910D (D BUS0 to D BUS3) respectively, each of which is n bits wide. As indicated by dashed lines in FIG. 9, there may be additional circuit blocks, and in particular, the total number of circuit blocks is for example any multiple of four and of each group of four. In each additional group of four circuit blocks, the output of a respective one will be coupled to each of the data buses 910A to 910D.

The data buses 910A to 910D are coupled to a synchronization block 912, which samples the data on buses 910A to 910D, based on the clock signal BCLK on the clock bus 314, to respectively provide output data on four n-bit output lines 915A, 915B, 915C and 915D.

In the embodiment of FIG. 9, due to the four data buses, the data from circuit blocks 902 to 908 remains on each of data buses 910A to 910D for a period four times as long as if only a single bus were provided. The circuit blocks 902 and 904 apply a logic "1" level to the clock bus 314 when their data is written to the corresponding bus, and the circuit blocks 906 and 908 apply a logic "0" level to the clock bus BCLK when their data is written to the corresponding bus. In this way, falling edges of the resulting clock signal on clock bus 314 may be used to clock the data signals on data buses 910A and 910B, while the rising edges of the resulting clock signal on clock bus 314 may be used to clock the data signals on buses 910C and 910D. It will be apparent to those skilled in the art that in alternative embodiments, a single n-bit output line could be provided from synchronization block 912, and the clock signal on bus 314 could be adapted accordingly, for example the circuit blocks 902 to 908 outputting "0", "1", "0", "1" respectively on the clock bus 314.

Furthermore, while FIG. 9 illustrates the example of four data buses, it will be apparent to those skilled in the art that the principle could be extended to eight or sixteen data buses, or high numbers equal to a power of 2.

Figure 10:
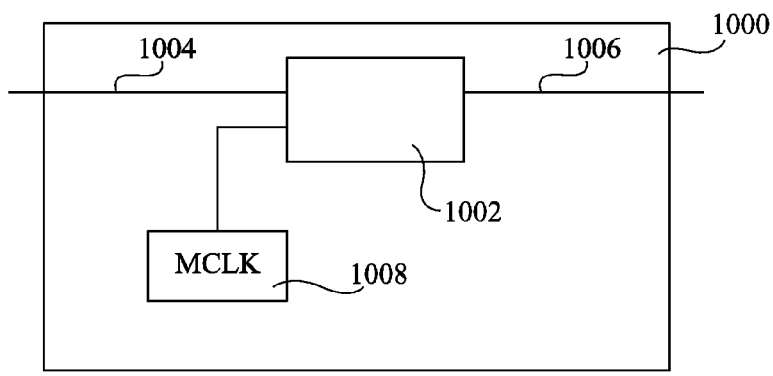
FIG. 10 illustrates an electronic device according to an embodiment.

FIG. 10 illustrates an electronic device 1000 comprising a circuit 1002, for example corresponding to one of the circuits described herein above. Circuit 1002 receives an input data signal on an input line 1004, and provides an output data signal on an output line 1006. Furthermore, the circuit 1002 receives a master clock signal MCLK from a block 1008, which for example comprises a local oscillator for generating a clock frequency in the range of 1 GHz to 100 GHz.

The circuit 1002 is for example an ADC, a multi-core processing unit, a DSP (digital signal processor), a data multiplexer or demultiplexer, or other type of circuit that can comprise a plurality of circuit blocks operating in an interleaved fashion.

The device 1000 is for example an electronics device such as a set top box, PC (personal computer) or the like, or a mobile device, such as a mobile telephone, digital camera, portable games console, laptop computer or the like.

An advantage of the embodiments described herein is that data signals on one or more data buses from multiple circuit blocks may be synchronized in a simple fashion, with the addition of very little circuitry. Furthermore, by providing a clock bus coupled to an output of each of the circuit blocks, the characteristics of such a bus are likely to be similar to those of the data bus or data buses, thereby improving the synchronization based on such a clock signal.

Having thus described at least one illustrative embodiment of the invention, various alterations, modifications and improvements will readily occur to those skilled in the art. For example, it will be apparent to those skilled in the art that rising and falling edges described herein could be inversed. Furthermore, it will be apparent to those skilled in the art that any of the circuits described herein could be duplicated, and arranged to operate in an interleaved fashion, thereby further increasing data throughput.

Furthermore, it will be apparent to those skilled in the art that the examples given in FIGS. 3B and 7B of the circuitry for generating the clock signal on the clock bus are merely examples, and that other implementation could be used, for example without using SR flip-flops. The use of SR flip-flops however advantageously provides a simple relatively low cost implementation.

What is claimed is:

1. A circuit comprising:
  a first circuit block adapted to receive a first clock signal and to provide a first output data signal at a first time determined by the first clock signal;
  a second circuit block adapted to receive a second clock signal and to provide a second output data signal at a second time determined by the second clock signal;
  a clock bus coupled to an output of the first circuit block and also to an output of the second circuit block, the output of the first circuit block being different from the output of the second circuit block, a third clock signal generated on the clock bus based on a first edge of the first clock signal and a second edge of the second clock signal; and a synchronization unit coupled to the clock bus and adapted to sample the first and second output data signals based on the third clock signal.

2. A method of synchronization comprising:
receiving, by a first circuit block, a first clock signal;
receiving, by a second circuit block, a second clock signal;
providing, by the first circuit block and not by the second circuit block, a first output data signal at a first time determined by the first clock signal;
providing, by the second circuit block and not by the first circuit block, a second output data signal at a second time determined by the second clock signal;
generating, by the first and second circuit blocks on a clock bus, a third clock signal having a first edge based on the first time and a second edge based on the second time; and
sampling the first and second output data signals based on the third clock signal.

3. The method of claim 2, wherein generating the third clock signal comprises asserting by the first circuit block a first timing edge on the clock bus and asserting by the second circuit block a second timing edge on the clock bus.

4. The method of claim 2, wherein the step of generating a third clock signal comprises:
asserting on the clock bus, by the first circuit block, a first logic state when the first circuit block generates a write signal to assert data on a first data bus; and
asserting on the clock bus, by the second circuit block, a second logic state, different from the first logic state, when the second circuit block generates a write signal to assert data on a second data bus.

5. A circuit comprising:
a master clock generator;
a first circuit block having a first clock input coupled to the master clock generator, a first data output coupled to a first data bus, and a first clock output coupled to a clock bus, wherein the first circuit block is configured to output, at the first data output, first data on the first data bus and simultaneously output, at the first clock output, a rising edge of a clock signal on the clock bus;
a second circuit block having a second clock input coupled to the master clock generator, a second data output coupled to a second data bus, and a second clock output different from the first clock output coupled to the clock bus, wherein the second circuit block is configured to output, at the second data output, second data on the second data bus and simultaneously output, at the second clock output, a falling edge of the clock signal on the clock bus; and
a synchronization block having a first data input coupled to the first data bus, a second data input coupled to the second data bus, and a synchronization clock input coupled to the clock bus.

6. The circuit of claim 5, wherein the first circuit block further comprises:
a flip flop having a set input configured to receive a write signal derived from a master clock signal received on the first clock input of the first circuit block, a reset input configured to receive a delayed signal, and an output coupled to an enable input of a buffer; and
the buffer having its output coupled to the clock bus.

7. The circuit of claim 6, wherein the delayed signal is the inverse of the write signal.

8. The circuit of claim 5, further comprising:
a third circuit block having a third clock input coupled to the master clock generator, a third data output coupled to the first data bus, and a third clock output coupled to the clock bus, wherein the third circuit block is configured to generate and output at the third clock output a rising edge of the clock signal on the clock bus interjacent the rising edges of the clock signal generated by the first circuit block; and
a fourth circuit block having a fourth clock input coupled to the master clock generator, a fourth data output coupled to the second data bus, and a fourth clock output coupled to the clock bus, wherein the fourth circuit block is configured to generate and output at the fourth clock output a falling edge of the clock signal on the clock bus interjacent the falling edges of the clock signal generated by the second circuit block.

9. A circuit, comprising:
a master clock generator;
a first circuit block having a first clock input coupled to the master clock generator, a first data output coupled to a data bus, and a first clock output coupled to a clock bus, wherein the first circuit block is configured to generate a first rising edge of a clock signal on the clock bus and a first falling edge of the clock signal, wherein the first falling edge occurs after the first rising edge;
a second circuit block having a second clock input coupled to the master clock generator, a second data output coupled to the data bus, and a second clock output coupled to the clock bus, wherein the second circuit block is configured to generate a second rising edge of the clock signal on the clock bus and a second falling edge of the clock signal, wherein the second rising edge occurs after the first falling edge, and wherein the second falling edge occurs after the second rising edge; and
a synchronization block having a data input and a synchronization clock input, wherein the data input is coupled to the data bus, and wherein the synchronization clock input is coupled to the clock bus, wherein the first and second circuit blocks are analog to digital converters adapted to operate in an interleaved fashion.

10. The circuit of claim 9, wherein the first rising edge and the second rising edge of the clock signal are generated based on a first rising edge and a second rising edge of a first clock signal received at the first clock input of the first circuit block.

11. The circuit of claim 9, wherein the first falling edge and the second falling edge of the clock signal are generated based on a first falling edge and a second falling edge of a second clock signal received at the second clock input of the second circuit block.

12. A method of synchronization comprising:
receiving a first clock signal at an input of a first circuit block;
generating, by the first circuit block, a first write signal in response to the first clock signal;
receiving a second clock signal at an input of a second circuit block;
generating, by the second circuit block, a second write signal in response to the second clock signal;
providing, by the first circuit block, a first data signal in response to the first write signal;
asserting, by the first circuit block, a rising edge of a third clock signal on a clock bus in response to the first write signal;
providing, by the second circuit block, a second data signal in response to the second write signal; and asserting, by the second circuit block, a falling edge of the third clock signal on the clock bus in response to the second write signal.

13. The method of claim 12, further comprising sampling the first data signal and the second data signal at the falling edge and the rising edge of the third clock signal, respectively.

14. The method of claim 12, wherein the first data signal is provided on a first bus connected to an output of the first circuit block.

15. The method of claim 14, wherein the first data signal is provided on the first bus by the first circuit block and not by the second circuit block, and wherein the second data signal is provided on a second bus by the second circuit block and not by the first circuit block.

16. The method of claim 12, wherein providing the first data signal in response to the first write signal comprises using a driver to drive the first data signal on a data bus, the driver being enabled using the first write signal, and wherein asserting the rising edge of the third clock signal comprises enabling a first clock driver with the first write signal thereby driving a high voltage on the clock bus.

17. The method of claim 16, wherein providing the second data signal in response to the second write signal comprises using a second driver to drive the second data signal on a second data bus, the second driver being enabled using the second write signal, and wherein asserting the falling edge of the third clock signal comprises enabling a second clock driver with the second write signal thereby driving a low voltage on the clock bus.

18. The method of claim 12, wherein the first circuit block comprises a first flip-flop coupled to a first buffer and wherein the first circuit block asserts the rising edge of the third clock signal by asserting the first write signal at an input of the first flip-flop thereby causing the first buffer to assert a high voltage level on the clock bus.

19. The method of claim 18, wherein the second circuit block comprises a second flip-flop coupled to a second buffer and wherein the second circuit block asserts the falling edge of the third clock signal by asserting the second write signal at an input of the second flip-flop thereby causing the second buffer to assert a low voltage on the clock bus.

20. A circuit comprising:
a first circuit block adapted to receive a first clock signal and to provide a first output data signal at a first time in response to a first write signal based on the first clock signal;
a second circuit block adapted to receive a second clock signal and to provide a second output data signal at a second time in response to a second write signal based on the second clock signal;
a clock bus coupled to an output of the first circuit block and also to an output of the second circuit block, the output of the first circuit block being different from the output of the second circuit block, a third clock signal generated on the clock bus based on the first and second write signals; and
a synchronization unit coupled to the clock bus and adapted to sample the first and second output data signals based on the third clock signal.

21. The circuit of claim 20, wherein the first and second clock signals are generated based on a master clock signal.

22. The circuit of claim 20, wherein each of the first and second circuit blocks comprises an SR (set, reset) flip-flop adapted to activate a corresponding buffer to generate the third clock signal on the clock bus.

23. The circuit of claim 20, further comprising a third circuit block adapted to receive a fourth clock signal and to provide a third output data signal at a time determined by the fourth clock signal, wherein the clock bus is further coupled to an output of the third circuit block, the third clock signal being further based on the time determined by the fourth clock signal, and wherein the synchronization unit is adapted to the first, second and third output data signals based on the third clock signal.

24. The circuit of claim 20, wherein the first circuit block is adapted to provide the first output data signal on a first data bus at the first time determined by a first timing edge of the first write signal and wherein the second circuit block is adapted to provide the second output data signal on a second data bus at the second time determined by a first timing edge of the second write signal, the first and second data buses being coupled to the synchronization unit.

25. The circuit of claim 24, wherein the second circuit block is adapted to apply, based on the first timing edge of the second clock signal, a first timing edge of the third clock signal on the clock bus and wherein the synchronization unit is adapted to sample the first output data signal based on the first timing edge of the third clock signal.

26. The circuit of claim 24, further comprising a third circuit block adapted to provide a third output data signal on the first data bus and a fourth circuit block adapted to provide a fourth output data signal on the second data bus.

27. The circuit of claim 24, further comprising a third circuit block adapted to provide a third output data signal on a third data bus and a fourth circuit block adapted to provide a fourth output data signal on a fourth data bus.

28. The circuit of claim 20, wherein the first and second circuit blocks are adapted to provide the first and second output data signals on a common data bus.

29. The circuit of claim 28, wherein the first circuit block is adapted to output the first output data signal at the first time determined by a first timing edge of the first clock signal, and to assert a rising and a falling timing edge on the clock bus based on the first timing edge or on a further timing edge following the first timing edge, and wherein the synchronization unit is adapted to sample the first output data signal based on the rising or falling timing edge.

30. The circuit of claim 20, wherein the first and second circuit blocks are analog to digital converters adapted to operate in an interleaved fashion.

31. The circuit of claim 20, wherein the first and second circuit blocks are processing units adapted to operate in parallel.

32. The circuit of claim 20, further comprising at least one data input coupled to the first and second circuit blocks, and at least one data output coupled to an output of the synchronization unit.

33. The circuit of claim 20, wherein the first time occurs before the second time.

34. The circuit of claim 20, wherein the first time is the same as the second time.

35. The circuit of claim 20, wherein the third clock signal is generated by the first circuit block and the second circuit block based on the first and second clock signals.

* * * * *